3,489,105
PROCESS OF MAKING THIN DOUGH
Yull Gunn Poon, 204 Centre St., Calgary,
Alberta, Canada
No Drawing. Filed Feb. 10, 1966, Ser. No. 526,402
Int. Cl. A23p *1/100;* A23d *2/36*
U.S. Cl. 107—54      1 Claim

ABSTRACT OF THE DISCLOSURE

Thin dough is prepared by dusting dough with cornstarch, passing it through adjustable rollers set at decreasing spacing with the product being folded and again dusted prior to the next pass. The thin sheet of dough is finally unfolded after the last pass through the rollers.

---

This invention relates to a process for making thin films of dough to be used for making noodles or for wrapping various foods to be deep fried, so as to form a crust thereon which will enhance the taste and appeal of such foods, or for making the oriental food known as "Won Ton," to be placed in soup or baked in an oven.

By the process of my invention I can produce a film of dough much thinner than, e.g. approximately one-half as thick as, the thinnest film of dough now available, to my knowledge, while still retaining a strength comparable to that of the dough now available. For example, my dough may be just .01 inch thick or even thinner, if desired.

Thus, according to my invention, I have provided, in a process of making a film of dough which comprises preparing a batch of dough, passing said batch through a machine which has means for forming a film of dough from said batch, said means including an adjustable roller, adjusting said roller until it is set to produce the thinnest film of dough normally producible by the machine and passing the dough through the machine with the roller thus set, the improvement which comprises taking the film of dough thus produced, dusting it with cornstarch on both sides, folding it, and, with the roller still thus set, passing it through the machine a second time in folded condition and finally unfolding it again, thereby obtaining a film approximately only one-half as thick as a film normally produced by the machine.

Preferably, I use a commercially available noodle machine to roll the dough, starting off with the rollers of the noodle machine set at their widest spacing and decreasing the spacing with each pass of the dough through the machine until the smallest possible spacing has been set, then taking the film of dough which has passed through this smallest spacing, dusting it with the corn starch on both sides, folding it and passing it through said smallest spacing for a second time and finally unfolding it again, thereby obtaining a film approximately only one-half as thick as a film normally produced by the machine, my thin film not being self-adherent and retaining the strength of an ordinary thick film.

A preferred embodiment of the invention will now be described, by way of example.

To make a batch of dough, the following ingredients are used:

11 lbs. flour
1 lb. eggs
4 drops yellow vegetable colouring
2 oz. salt
50 ozs. water, lukewarm
Cornstarch as required The flour is placed in a pile on a table and a depression is formed in the middle of this pile. The other ingredients are placed in this depression and the whole is thoroughly mixed in known manner to form the batch of dough, which is then passed through an ordinary noodle machine having its rollers spaced at their widest possible setting. The film of dough thus formed is dusted on both sides with corn starch and folded upon itself, the rollers of the noodle machine are set to a slightly smaller spacing and the dough passed through the machine again, this sequence of steps being repeated until the rollers have been set to their closest possible spacing and the dough passed therethrough. Thereupon, as mentioned above, the film of dough is dusted, folded and passed through the machine once again and unfolded and may then be frozen and packaged for sale.

If desired, the thin film thus produced may be folded more than once and passed through the machine again and unfolded to give a film of dough as thin as, or even thinner than ordinary paper.

The embodiments of the invention in which an exclusive property or privilege is claimed are defined as follows:

1. In a process of making a sheet of dough wherein dough is repeatedly passed between a pair of rollers of a dough sheeting device, at least one of said rollers being adjustable to change the gap between said rollers, wherein the gap between the rollers is reduced during the process to produce a thin sheet of dough, and wherein the gap is set at a minimum to produce the thinnest sheet of dough normally producible by the device; the improvement which comprises: dusting the thin sheet of dough thus produced on both sides with cornstarch; folding the dusted sheet; passing the folded sheet through the rollers with the gap at the minimum setting; and unfolding the dough sheet thus produced to provide a dough sheet approximately one half as thick as the thinnest sheet normally producible by the device when the gap is at the minimum setting.

References Cited
UNITED STATES PATENTS

| | | | |
|---|---|---|---|
| 2,645,189 | 7/1953 | Hansalik. | |
| 2,687,699 | 8/1954 | Oakes | 107—12 |
| 2,965,050 | 12/1960 | Doering | 107—12 XR |
| 3,279,395 | 10/1962 | Butler | 107—12 |

OTHER REFERENCES

Otterbacher et al., Baker's Digest, June 1953, pp. 59 and 60.

The Chinese Cook Book, January 1936, p. 43.

RAYMOND N. JONES, Primary Examiner

U.S. Cl. X.R.

99—92